(12) United States Patent
Henkel et al.

(10) Patent No.: US 7,018,297 B2
(45) Date of Patent: Mar. 28, 2006

(54) TRIPOD JOINT

(75) Inventors: Juergen Henkel, Kernen (DE);
Andreas Kollmann, Waldachtal (DE);
Peter Muenich, Fellbach (DE); Birgit Neuwirth, Weinstadt (DE); Rolf Schroeder, Stuttgart (DE); Stefan Weniger, Welzheim (DE); Guenter Woerner, Kernen (DE)

(73) Assignee: DaimlerChrysler AG, Stuttgart (DE)

( * ) Notice: Subject to any disclaimer, the term of this patent is extended or adjusted under 35 U.S.C. 154(b) by 298 days.

(21) Appl. No.: 10/218,724

(22) Filed: Aug. 13, 2002

(65) Prior Publication Data

US 2003/0040365 A1 Feb. 27, 2003

(30) Foreign Application Priority Data

Aug. 23, 2001 (DE) ................. 101 41 440

(51) Int. Cl.
*F16D 3/205* (2006.01)

(52) U.S. Cl. ........................ 464/111; 464/905
(58) Field of Classification Search ............... 464/111, 464/132, 122–124, 905; 384/50, 51; F16D 3/205
See application file for complete search history.

(56) References Cited

U.S. PATENT DOCUMENTS

| 2,662,381 | A | * | 12/1953 | Wildhaber ............... 464/905 |
| 2,897,581 | A | * | 8/1959 | Cowles et al. |
| 3,216,087 | A | * | 11/1965 | Harrington ............. 464/132 X |
| 4,619,628 | A | | 10/1986 | Orain |
| 4,674,993 | A | * | 6/1987 | Mazziotti et al. ........... 464/111 |
| 4,684,356 | A | * | 8/1987 | Kimata et al. .............. 464/111 |
| 4,708,693 | A | | 11/1987 | Orain |
| 4,768,990 | A | | 9/1988 | Farrell et al. |
| 5,098,342 | A | | 3/1992 | Mizukoshi |
| 5,160,297 | A | | 11/1992 | Uchman |
| 5,397,271 | A | | 3/1995 | Poulin |
| 5,496,217 | A | | 3/1996 | Perrow et al. |
| 6,217,454 | B1 | | 4/2001 | Ikeda et al. |

FOREIGN PATENT DOCUMENTS

| DE | 37 41 049 | | 7/1988 |
| EP | 1 286 071 A1 | * | 2/2003 |
| FR | 2 605 071 | | 4/1988 |
| JP | 11-082532 | | 3/1999 |

* cited by examiner

*Primary Examiner*—Greg Binda
(74) *Attorney, Agent, or Firm*—Kenyon & Kenyon

(57) ABSTRACT

Tripod joints have a joint outer part and a joint inner part which are in driving connection to each other with cylindrical rolling bodies being connected in between and axial displacement and pivotability being ensured. The longitudinal axes of adjacent rolling bodies are arranged at an acute angle to one another. This may result in an improved mechanical behavior of the tripod joint particularly during pivoting. The tripod joints may be suitable for the displaceable and pivotable driving connection of two shaft ends, in particular in conjunction with drive trains or side shafts of motor vehicles.

9 Claims, 5 Drawing Sheets

TRIPOD JOINT

CROSS-REFERENCE TO RELATED APPLICATIONS

The present application claims priority to Application No. 101 41 440.4, filed in the Federal Republic of Germany on Aug. 23, 2001, which is expressly incorporated herein in its entirety by reference thereto.

FIELD OF THE INVENTION

The present invention relates to a tripod joint.

BACKGROUND INFORMATION

Tripod joints are used, for example, as side shafts of motor vehicles. In this case, the tripod joints are used for transmitting driving torques between two driving elements of a drive train. The tripod joints permit a relative displacement and a relative pivoting of the driving elements to be compensated for. For the use in the case of side shafts of a motor vehicle, relative movements of this type are caused by spring deflections of the vehicle wheels.

Conventional tripod joints have a joint outer part and a joint inner part held therein. Rolling bodies are inserted in the force flux between the joint outer part and joint inner part. With a rolling movement of the rolling bodies, the joint outer part is axially displaceable and/or pivotable with respect to the joint inner part about an axis transverse to the plane defined by the longitudinal axes of the joint outer part and of the joint inner part with the transmission of a driving torque being ensured. Use is made of cylindrical rolling bodies which, for the purpose of transmitting large driving torques, may be advantageous in comparison with spherical rolling bodies due to the linear contact formed by the adjacent components.

In the case of components configured in such a manner, it may be disadvantageous that mechanical impairments of the transmission function may occur in the case of three-dimensional movements of a tripod joint, which, in the worst case, may result in the drive train vibrating and/or producing noise and in resultant impairments of comfort.

It is an object of the present invention to provide a tripod joint which is improved with regard to the mechanical transmission properties.

SUMMARY

The above and other beneficial objects of the present invention are achieved by providing a tripod joint as described herein.

In accordance with one example embodiment of the present invention, longitudinal axes of adjacent rolling bodies are orientated at an acute angle with respect to one another.

The investigations on which the present invention is based have shown that in the case of an axial, translatory displacement of the joint inner part with respect to the joint outer part, a pure rolling movement of the rolling bodies with optimized frictional conditions arises for cylindrical rolling bodies. When the joint parts pivot, which is unavoidable (additional) in practice with rotating driving elements, a kinematically necessary, two-dimensional movement of the pin with respect to the joint outer part is produced. This gives rise to a movement component in the longitudinal direction of the rolling bodies, which component may be compensated only by a sliding movement of the rolling bodies with respect to the adjacent components. These sliding movements cause (sliding) frictional forces which constitute the cause of the undesirable mechanical impairments. The frictional forces form non-linear forces and result, in particular, in a third-order excitation of vibration. The orientation according to the present invention of the longitudinal axes of adjacent rolling bodies with respect to one another enables the rolling bodies to have different, preferred rolling directions, as a result of which the sliding fractions do not compulsorily occur at all rolling bodies, but rather occur in a minimized manner only for individual rolling bodies or do not occur at all for particular, three-dimensional forms of movement. In addition to avoiding the abovementioned disadvantages, the reduced sliding fraction may have a positive effect on the wear or the service life of the joint, the rolling bodies or the running paths of the rolling bodies. In the case of a skillful, kinematic configuration of the transmission elements, self-centering of cages, which hold the rolling bodies, with respect to the pins of the tripod joint may be obtained, and so centering devices, such as springs, etc. may be omitted or may be constructed more simply or cost-effectively. The components are not required to have any play in the circumferential direction. The components may even be built over with a lightweight covering. The freedom from play may result in improved comfort in the vehicle, e.g., in the case of load-change processes.

According to an example embodiment of the present invention, the longitudinal axes of a plurality of rolling bodies assigned to a running path have a common intersecting point. For pivoting the joint inner part about the common intersecting point, an optimized rolling and sliding behavior of the tripod joint arises, since all of the rolling bodies move on a circular path for which the pure rolling movement of the rolling bodies is orientated tangentially to the circular path, with the result that no sliding movement occurs. For a pure translatory movement, i.e., a pure axial displacement of the joint inner part with respect to the joint outer part, the intersecting point ideally lies in infinity®=∞), while for a pure pivoting movement the intersecting point may be in the region of the central point of the tripod star at the distance $R=R_G$. For complex three-dimensional forms of movement, an ideal distance $0<R<\infty$ is to be defined. The ideal distance, from which the acute angle, which is to be selected, between adjacent longitudinal axes results, may be determined according to the rolling bodies selected, the component dimensions, the forces to be transmitted and the relative displacements and pivotings occurring during operation. For example, a typical movement profile may be taken as a basis here, based on which the sliding movements occurring during operation are determined and, by varying the acute angle, are minimized. In this manner, relatively large sliding frictional forces may be displaced into operating ranges which rarely occur while relatively low sliding frictional forces are to be accumulated in operating ranges which occur frequently.

According to an example embodiment of the present invention, a tripod joint for transmitting a driving torque between two driving elements of a drive train includes: a joint inner part having a tripod star with a pin; a joint outer part holding the joint inner part; and rolling bodies inserted in a force flux between the joint outer part and the joint inner part, the rolling bodies having a cylindrical lateral surface. The joint outer part and the joint inner part may be at least one of axially displaceable and pivotable with respect to each other in accordance with rolling movement of the rolling bodies. The longitudinal axes of adjacent rolling bodies may be orientated at an acute angle with respect to one other.

According to an example embodiment of the present invention, the longitudinal axes of a plurality of rolling bodies may have a common intersecting point. The intersecting point may be located in a region of a central point of the tripod star.

According to an example embodiment of the present invention, the tripod joint may include a cage and a plurality of rolling bodies accommodated in the cage. The longitudinal centers of the rolling bodies of the cage may be located on a straight line or arranged on a curved, planar curve. Further, the longitudinal center of the rolling bodies of the cage may be located on one of a circular arc and a cutout of an ellipse.

Exemplary embodiments of the tripod joint according to the present invention are explained in greater detail below with reference to the Figures.

DETAILED DESCRIPTION

Figure 1:
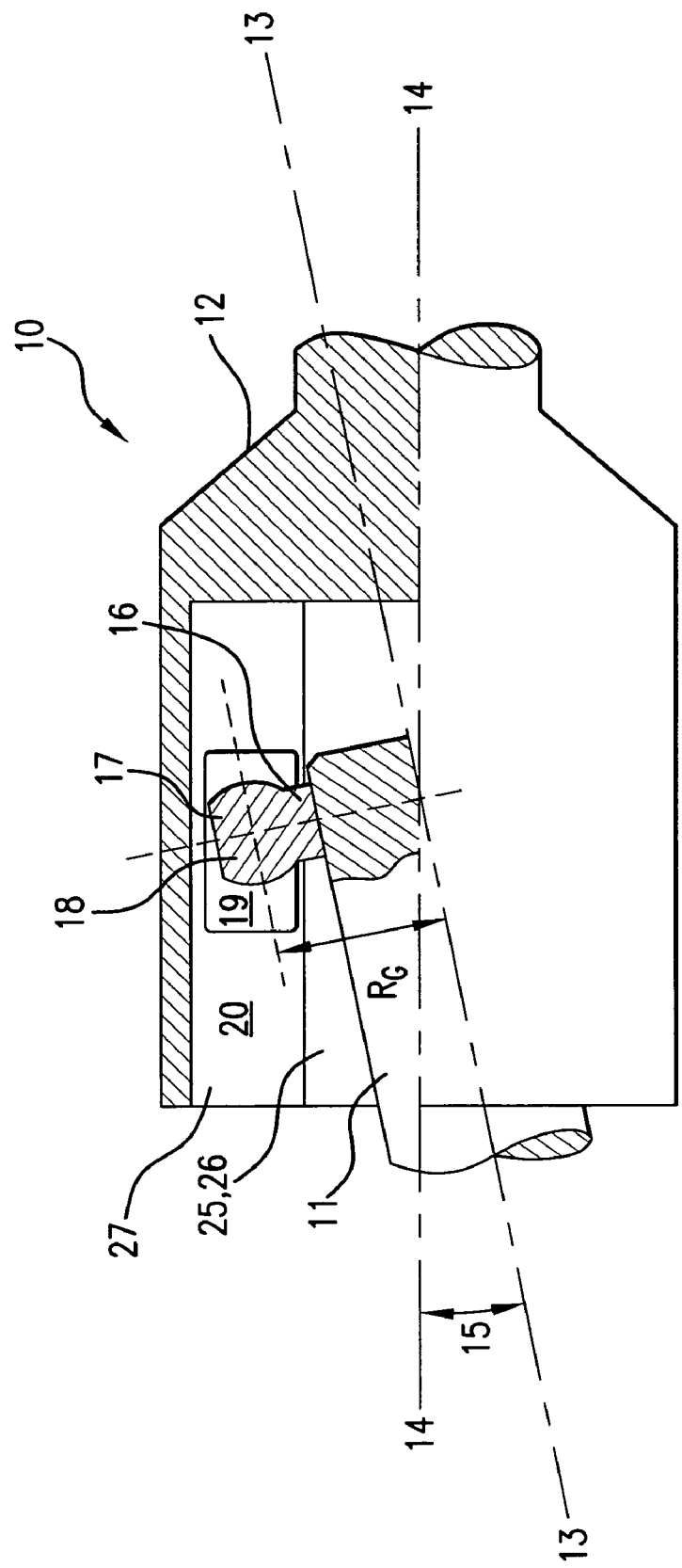
FIG. 1 is longitudinal cross-sectional view of a tripod joint according to the present invention.

A tripod joint 10 has a joint inner part 11 and a joint outer part 12 holding the latter. The joint inner part 11 and the joint outer part 12 are in each case connected, at least in a rotationally fixed manner, to a driving element of a drive train of a motor vehicle, for example, to a drive shaft and a vehicle wheel. The tripod joint 10 is used for transmitting a driving torque between the joint inner part 11 and the joint outer part 12 while ensuring a relative displacement along the longitudinal axis 13—13 of the joint inner part 11 and along the longitudinal axis 14—14 of the joint outer part 12, a relative pivoting of the joint inner part 11 with respect to the joint outer part 12, which pivoting is associated with a change in the angle 15 between the longitudinal axes 13—13 and 14—14, and a three-dimensional movement which arises from a combination of the above-mentioned forms of movement.

The joint inner part 11 has, at the end arranged on the inside, three pins 16 which are formed as a single piece of a number of pieces together with the latter, are orientated radially and are distributed in each case at 120° in the circumferential direction and form a tripod star. The pins 16 have in each case a partially spherical ball body 17. In order to transmit forces in both circumferential directions, the ball body 17 bears, in each case in the region of the spherical lateral surface, against a correspondingly configured recess 18 of a pressure element 19. On the opposite side of the pressure element 19, which side faces a flat mating surface 20 of the joint outer part 12, the pressure element is of flat configuration with a running surface 21. The mating surface 20 may be formed by a relatively large, flat surface or else may be provided in a path or groove 22 of the joint outer part 12. The running surface 21 and the mating surface 20 are orientated parallel to each other. Cylindrical rolling bodies 23, e.g., rollers or needles, are held between the latter forming a linear contact. That is, cylindrical rolling bodies 23 are inserted in a force flux between the joint outer part 12 and the joint inner part 11. A plurality of rolling bodies are guided in a cage 24. In order to transmit circumferential forces in the opposite direction, each pin 16 is configured with the associated pressure elements 19, the rolling bodies 23 and the surfaces 20, 21 symmetrically to a pin central plane accommodating the longitudinal axis 13—13.

The running surface 21 of a pressure element 19 may have a rectangular form, with the result that as many rolling bodies 23 as possible form a load-bearing contact with the surface pressure being reduced. However, circular or oval pressure elements 19 are also possible.

Figure 8:
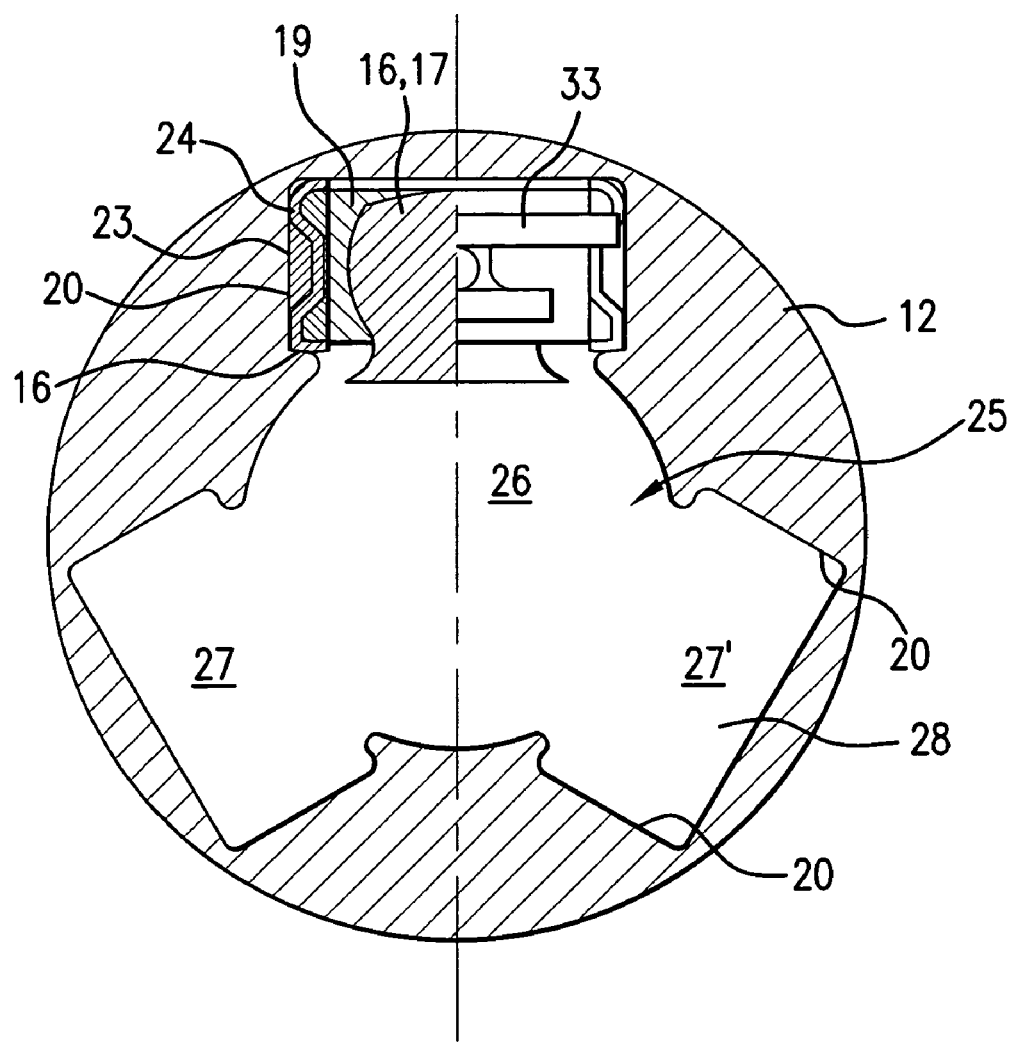
FIG. 8 is a cross-sectional view of a tripod joint according to the present invention.

The joint outer part 12 has a recess 25 orientated in the direction of the longitudinal axis 14—14 with an essentially circular, central hole 26 and three receiving spaces 27 which are orientated radially and are distributed in each case at 120° in the circumferential direction and are used in each case for receiving and supporting a pin 16, two pressure elements 19 and rolling bodies 23. In the section illustrated in FIG. 2, the receiving spaces 27 have an essentially U-shaped contour open in the direction of the hole 26, the side limbs of the U-shaped contour being formed by the mating surfaces 20. In the exemplary embodiment illustrated in FIG. 1, the side limbs are of rectilinear configuration without a transitional region to the mating surfaces 20. An additional or sole guidance of the rolling bodies 23 and cages 24 by the joint outer part may be achieved if grooves 28, as shown in FIG. 8, are introduced into the side limbs, the mating surfaces 20 forming the base of the groove and the cages 24 being guided in the radial direction by the side surfaces of the grooves 28.

Figure 2:
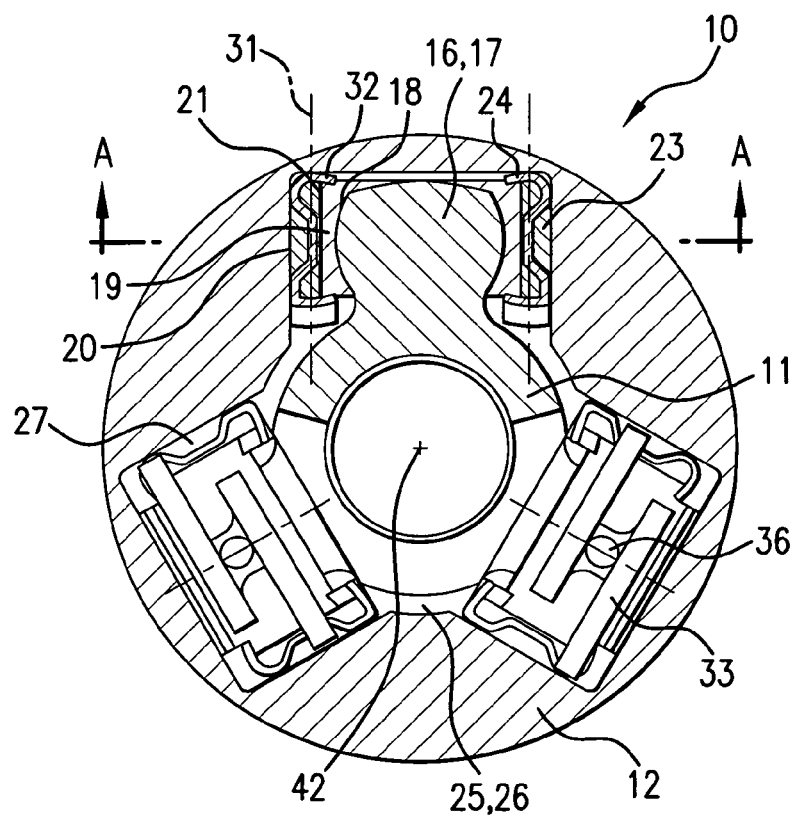
FIG. 2 is a cross-sectional view of a tripod joint according to the present invention.
Figure 7:
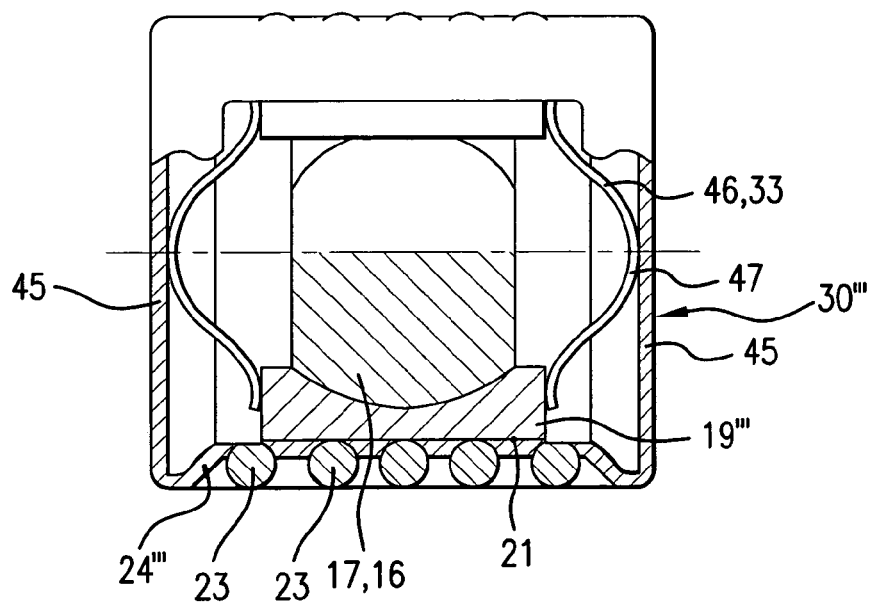
FIG. 7 is a cross-sectional view of a joint pin according to the present invention with pressure element, moving cage, rolling bodies and centering elements, taken along the line A—A illustrated in FIG. 2.

Two pressure elements 19, as shown in FIG. 2, and two cages 24, as shown in FIG. 2, may be used per pin 16. As an alternative, the two pressure elements 19 may be connected to each other via connecting regions or webs 34 to form a pressure body 35, as shown in FIG. 3, and/or the two cages 24 may be configured as a single-piece cage 30, as shown in FIG. 7.

As illustrated in FIG. 2, the rolling bodies 23 are guided in a cage 24. The rolling bodies 23 are guided in the cages 24 with the relative position of the longitudinal axes 31 of the rolling bodies 23 with respect to each other being ensured. The cages 24 are guided in the radial direction with respect to the pressure element 19 via shoulders 32 engaging around and enclosing the pressure element 19. The cages 24 may be "clipped" via the shoulders 32 onto the pressure element 19, as illustrated. The cages 24 may furthermore be centered in the running direction of the rolling bodies 23 via spring elements 33. Two cages 24 of a pin 16 may be guided and centered via a common spring element 33.

According to an example embodiment of the present invention, the longitudinal axes 31 of a plurality of rolling bodies 23 assigned to a running path have a common intersecting point 39. For pivoting the joint inner part 11 about the common intersecting point 39, an optimized rolling and sliding behavior of the tripod joint arises, since all of the rolling bodies 23 move on a circular path for which the pure rolling movement of the rolling bodies 23 is orientated tangentially to the circular path, with the result that no sliding movement occurs. For a pure translatory movement, i.e., a pure axial displacement of the joint inner part 11 with respect to the joint outer part 12, the intersecting point 39 ideally lies in infinity (R=∞), while for a pure pivoting movement the intersecting point 39 may be in the region of the central point of the tripod star at the distance R=RG. For complex three-dimensional forms of movement, an ideal distance 0<R<∞ is to be defined. The ideal distance, from which the acute angle, which is to be selected, between adjacent longitudinal axes 31 results, may be determined according to the rolling bodies 23 selected, the component dimensions, the forces to be transmitted and the relative displacements and pivotings occurring during operation. For example, a typical movement profile may be taken as a basis here, based on which the sliding movements occurring during operation are determined and, by varying the acute angle, are minimized. In this manner, relatively large sliding frictional forces may be displaced into operating ranges which rarely occur while relatively low sliding frictional forces are to be accumulated in operating ranges which occur frequently.

Figure 3:
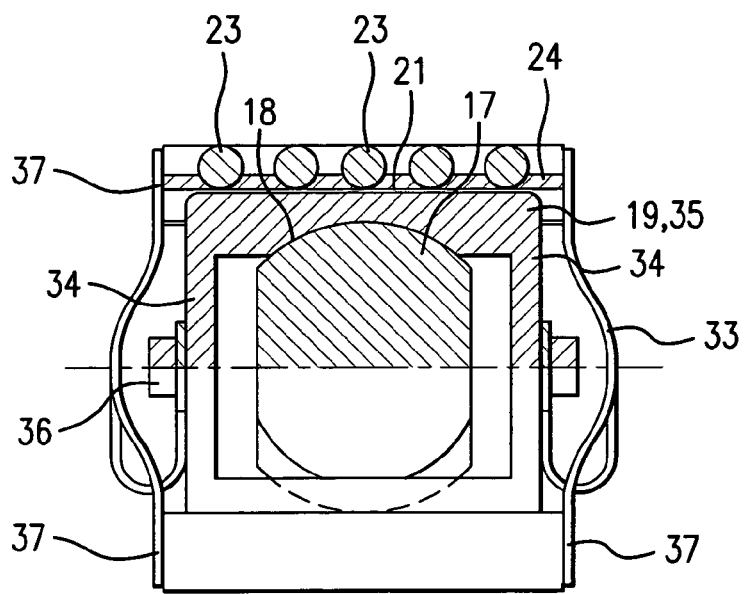
FIG. 3 is a cross-sectional view of a joint pin according to the present invention with pressure element, moving cage, rolling bodies and centering elements taken along the line A—A illustrated in FIG. 2.

According to the exemplary embodiment illustrated in FIG. 2 and FIG. 3, two spring elements 33 are connected to the pressure element 19, the pressure body 35 or the ball body 17 via a respective fastening arrangement 36. The spring elements 33 in each case have two elastic fingers 37 which bear against the opposite cages 24 or are connected thereto, for the purpose of supporting them.

Figure 4:
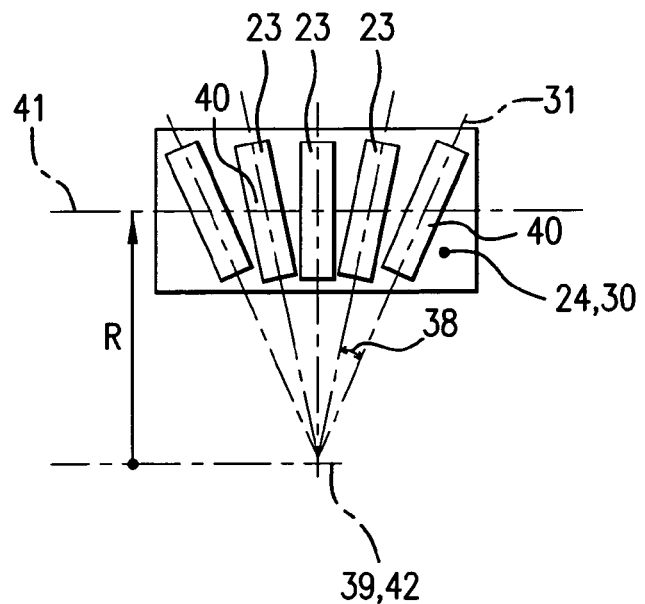
FIG. 4 illustrates a moving cage according to the present invention with rolling bodies.

As illustrated in FIG. 4, the longitudinal axes 31 of the cylindrical rolling bodies 23 are inclined with respect to each other at an acute angle 38 in an essentially rectangular cage 24, 30 and intersect at a common intersecting point 39. The longitudinal centers 40 of the rolling bodies 23 are on a straight line 41 which is spaced apart from the central point 42 of the tripod star at a distance R. The intersecting point 39 may be located in a region of the central point 42 of the tripod star.

Figure 5:
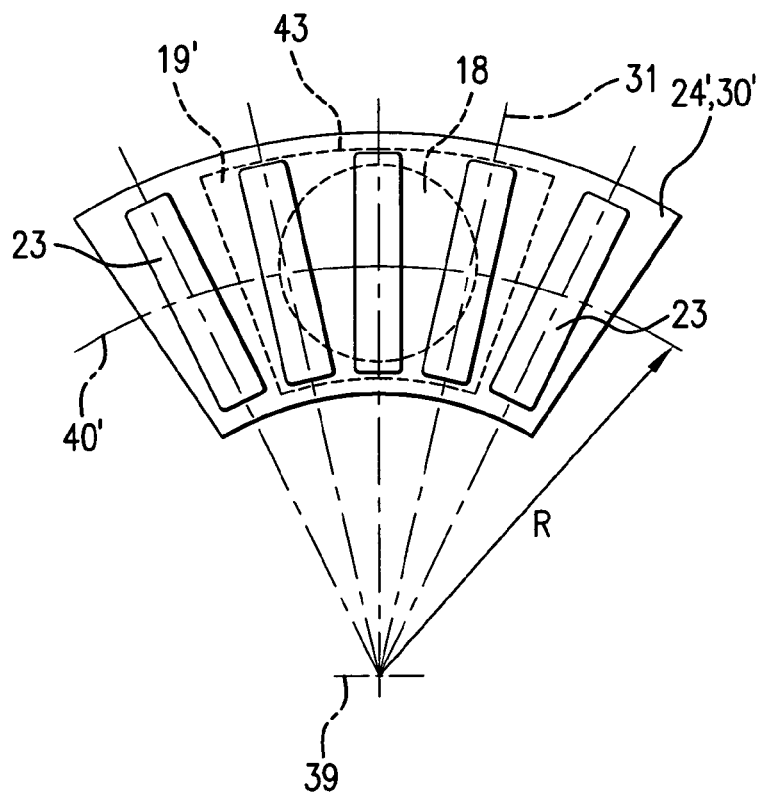
FIG. 5 illustrates a moving cage according to the present invention with rolling bodies and a pressure element illustrated by dashed lines.

As illustrated in FIG. 5, the longitudinal centers 40' may be on a circular path having the radius R, the cage 24', 30' in this case being configured in the form of a segment of a circle and, e.g., the central point of the segments of a circle bounding the cage 24', 30' corresponds to the intersecting point 39. The contour 43 of the pressure element 19', which has an outer contour in the form of a segment of a circle and, on the side arranged opposite the rolling bodies, has the partially spherical recess 18 for receiving the ball body 17,is illustrated by dashed lines in FIG. 5.

Figure 6:
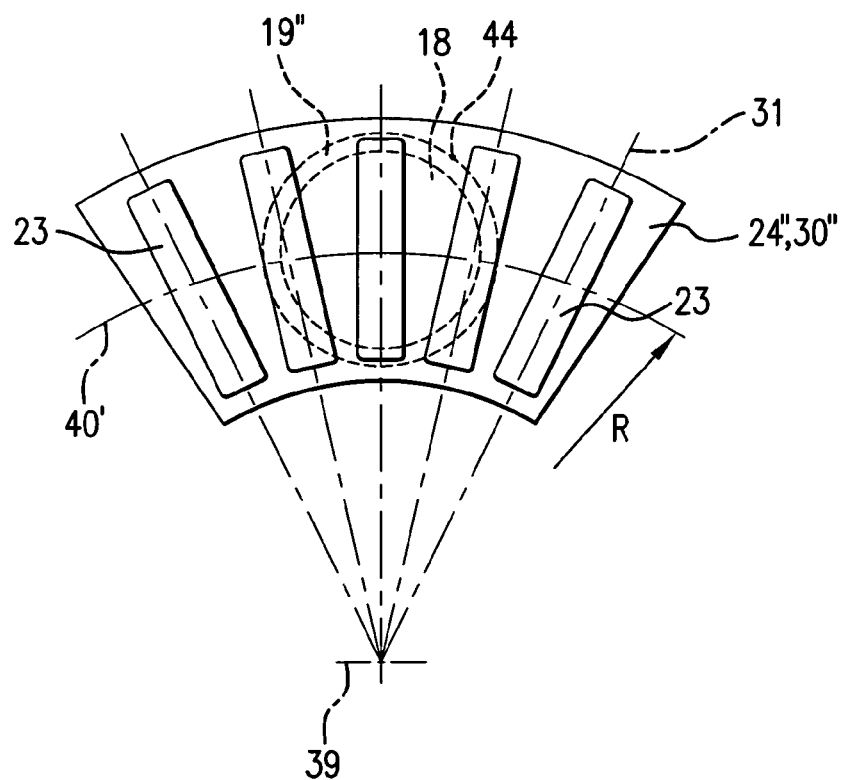
FIG. 6 illustrates a moving cage according to the present invention with rolling bodies and a pressure element illustrated by dashed lines.

As a departure from this, as illustrated in FIG. 6—with the cage 24", 30" and the rolling bodies 23 configured according to FIG. 5—the pressure element 19", 20 may have a circular outer contour 44 arranged concentrically to the outer contour of the recess 18.

According to the exemplary embodiment illustrated in FIG. 7, the cages 24''', which are arranged on the opposite sides of the ball body 17, are connected to each other via connecting regions 45 to form a single-piece cage 30'''. In this case, it may be ensured that the position of the cages 24''' in the running direction coincides. The cage 30''' may be centered with respect to pressure elements 19''', pressure body 29 or the ball body 17 via one or two spring elements 33 of simplified configuration. In the exemplary embodiment illustrated in FIG. 7, two compression springs 46 are arranged in the running direction on both sides of the pressure elements 19'''. The compression springs 46 are configured as leaf springs having a central bulge 47, the end regions of which are supported on the pressure elements 19''' and which bear in the region of the bulge 47 against a connecting region 45.

In the exemplary embodiment illustrated in FIG. 8, the mating surfaces are formed in grooves 28 in receiving space 27' of a joint outer part 12'. In these grooves 28, the rolling bodies 23 are guided together with the cages 24 in the radial direction. In this case, the radial guidance of the cages 24 with respect to the pressure elements 19 via the shoulders 32 as illustrated in FIG. 2 may be omitted.

The longitudinal centers 40, 40' of adjacent rolling bodies 23 may be on a curve, a straight line or a circular arc.

The cages 24, 30 may execute purely translatory movements with respect to the mating surfaces 20. According to the exemplary embodiment illustrated in FIG. 8, the cages 24 are guided in rectilinear grooves 28 of the joint outer part 12'. In this case, the shoulders 32 of the cages 24 are omitted, with the result that there is no radial guidance of the cages 24 with respect to the pressure elements 19, 19' and the pressure elements 19, 19' may execute relative movements and pivotings in the radial direction with respect to the cages 24.

In the exemplary embodiment illustrated in FIG. 2, the cages 24 are pivoted with the radial distance from the pin 16 remaining the same. In this case, the cage 24 does not execute a rectilinear movement with respect to the joint outer part 12, but rather a curved pivoting movement. For this purpose, coordinated, curved grooves 28 or else—as illustrated in FIG. 1—mating surfaces 20 which are not arranged in grooves are to be provided in the joint outer part 12.

The kinematic limits of the pivoting movement are formed by the geometry of the cage 24 and of the joint outer part 12. During operation of the tripod joint 10, in borderline situations controlling contact of the pressure elements 19, 19' by the end stops of the cage 24 or else radial contact of cage 24 and joint outer part 12 may occur. These contacts do not have a negative effect on the operating comfort because the forces occur stochastically only in borderline situations and therefore do not lead to periodic excitation.

The abovementioned arrangements of guiding the cages 24 with respect to the joint outer part 12 and the pressure elements 19 or 19' may also be entirely omitted or may be of elastic configuration. In this case, an undefined form of movement of the cage 24 with respect to the adjacent components arises, which may result in a minimization of wear. As an alternative, the movement may occur in a self-centering manner, in particular by the arrangement according to the present invention of the longitudinal axes 31 of the rolling bodies 23 at an acute angle 38, the rolling path of the cage 24 being automatically established on the mating surface 20 on account of the effective outer and inner rolling-body guiding forces.

Without departing from the principle on which the present invention is based, it is possible to form groups of adjacent or non-adjacent rolling bodies 23, rolling bodies 23 of one group having longitudinal axes 31 orientated parallel to one another, and these longitudinal axes 31 forming a second, acute angle 38 with respect to the longitudinal axes 31 of the rolling bodies 23 of other groups. As an alternative or in addition, the longitudinal axes 31 of adjacent rolling bodies 23 of one group may be inclined with respect to one another at a first angle 38 while the rolling bodies 23 of a second group are inclined with respect to one another at a second angle 38. Different angles 38 for adjacent longitudinal axes 31, for example angles 38 which rise or fall in the running direction from the center of the cage 24, are possible.

The arrangements according to the present invention may be used in conjunction with any desired tripod-joint configurations, for example tripod joints corresponding to those described in U.S. Pat. Nos. 4,619,828 or 4,708,693.

The essentially cylindrical rolling bodies 23 may have a contour which is slightly curved in the longitudinal direction of the lateral surface, as a result of which the sliding fraction in the case of a movement component in the direction of the longitudinal axis 31 of the rolling bodies 23 or in the case of rotational movements of the rolling bodies transversely with respect to the longitudinal axis 31 may be further reduced.

Furthermore, the use of tapered rollers (with a small tapered opening angle) is possible as rolling bodies 23, for which the pivoting may be further simplified. In this case, in order to ensure a translatory displacement, a further degree of freedom of the joint may be provided.

The example embodiments described involve configurations only given by way of example. A combination of the described features for different embodiments is possible. Further features, in particular features which have not been described, of the device parts belonging to the invention are to be taken from the device-part geometries illustrated in the drawings.

What is claimed is:

1. A tripod joint for transmitting a driving torque between two driving elements of a drive train, comprising:
   a joint inner part having a tripod star with a pin;
   a joint outer part holding the joint inner part; and
   rolling bodies inserted in a force flux between the joint outer part and the joint inner part, each of the rolling bodies having a cylindrical lateral surface;
   wherein the joint outer part and the joint inner part are at least one of axially displaceable and pivotable with respect to each other in accordance with rolling movement of the rolling bodies; and
   wherein longitudinal axes of adjacent rolling bodies arranged along common surfaces of the joint outer part and the joint inner part are orientated at an acute angle with respect to one another.

2. The tripod joint according to claim 1, wherein the longitudinal axes of a plurality of the rolling bodies have a common intersecting point.

3. The tripod joint according to claim 2, wherein the intersecting point is located in a region of a central point of the tripod star.

4. The tripod joint according to claim 1, further comprising a cage, a plurality of the rolling bodies accommodated in the cage.

5. The tripod joint according to claim 4, wherein longitudinal centers of the rolling bodies of the cage are located on a straight line.

6. The tripod joint according to claim 4, wherein longitudinal centers of the rolling bodies of the cage are arranged on a curved, planar curve.

7. The tripod joint according to claim 6, wherein the longitudinal center of the rolling bodies of the cage are located on one of a circular arc and a cutout of an ellipse.

8. The tripod joint according to claim 1, wherein the rolling bodies arranged along common surfaces of the joint outer part and the joint inner part are arranged substantially coplanar.

9. A tripod joint for transmitting a driving torque between two driving elements of a drive train, comprising:
   a joint inner part having a tripod star with a pin;
   a joint outer part holding the joint inner part; and
   a plurality of rolling bodies inserted in a force flux between the joint outer part and the joint inner part, each of the rolling bodies having a cylindrical lateral surface, the rolling bodies arranged in at least one plane;
   wherein the joint outer part and the joint inner part are at least one of axially displaceable and pivotable with respect to each other in accordance with rolling movement of the rolling bodies; and
   wherein longitudinal axes of adjacent rolling bodies arranged within each of the at least one plane are orientated at an acute angle with respect to one other.

* * * * *